US008762606B2

(12) United States Patent
Ha (10) Patent No.: US 8,762,606 B2
(45) Date of Patent: Jun. 24, 2014

(54) SIGNAL PROCESSING APPARATUS AND CONTROL METHOD THEREOF

(75) Inventor: Byeong-woon Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 255 days.

(21) Appl. No.: 13/205,938

(22) Filed: Aug. 9, 2011

(65) Prior Publication Data

US 2012/0127373 A1   May 24, 2012

(30) Foreign Application Priority Data

Nov. 22, 2010  (KR) .................. 10-2010-0116088

(51) Int. Cl.
*G06F 1/00*   (2006.01)
*G06F 13/00*  (2006.01)

(52) U.S. Cl.
USPC ............... 710/64; 710/72; 710/313; 713/300

(58) Field of Classification Search
CPC ........................................................ G06F 1/00
USPC ........ 710/62, 64, 72, 300–303, 313; 713/300; 381/309
See application file for complete search history.

(56) References Cited

U.S. PATENT DOCUMENTS

| | | | | |
|---|---|---|---|---|
| 5,363,122 A * | 11/1994 | Suenaga et al. | ............... | 345/212 |
| 7,769,187 B1 * | 8/2010 | Farrar et al. | .................. | 381/74 |
| 8,024,491 B1 * | 9/2011 | Wright et al. | ..................... | 710/8 |
| 8,261,000 B2 * | 9/2012 | Kelley et al. | .................. | 710/304 |
| 2002/0062621 A1 * | 5/2002 | Goettl et al. | ................. | 52/733.2 |
| 2003/0140262 A1 * | 7/2003 | Cromer et al. | ................ | 713/310 |
| 2004/0258257 A1 * | 12/2004 | Hupp | ............................ | 381/120 |
| 2005/0111182 A1 * | 5/2005 | Lin et al. | ....................... | 361/686 |
| 2008/0002350 A1 * | 1/2008 | Farrugia | ........................ | 361/686 |
| 2008/0065246 A1 * | 3/2008 | Zorkendorfer et al. | ........ | 700/94 |
| 2009/0146909 A1 * | 6/2009 | Lection | .......................... | 345/1.1 |
| 2009/0271534 A1 * | 10/2009 | Acosta et al. | .................... | 710/16 |
| 2010/0100643 A1 * | 4/2010 | Shim et al. | ........................ | 710/1 |
| 2010/0104119 A1 * | 4/2010 | Lan | ................................ | 381/309 |
| 2010/0195847 A1 * | 8/2010 | Ieda | ............................... | 381/119 |
| 2010/0235659 A1 * | 9/2010 | Sawyers et al. | ............... | 713/320 |
| 2010/0315210 A1 * | 12/2010 | Travis et al. | ............. | 340/310.11 |
| 2011/0012727 A1 * | 1/2011 | Pance et al. | .................... | 340/505 |
| 2011/0219159 A1 * | 9/2011 | Park | ............................... | 710/300 |

* cited by examiner

*Primary Examiner* — Christopher Shin
(74) *Attorney, Agent, or Firm* — Sughrue Mion, PLLC (57) ABSTRACT

A signal processing apparatus and a control method thereof are provided. The signal processing apparatus includes a signal processor which processes a video signal and/or an audio signal; a power supply which generates a power signal; a first connector configured to be connected with an external second connector; and a control circuit which outputs the video signal and/or audio signal and the power signal if the external second connector is connected to the first connector, and performs a shutoff operation to not output the power signal if the first connector is not connected to the external second connector.

15 Claims, 7 Drawing Sheets

SIGNAL PROCESSING APPARATUS AND CONTROL METHOD THEREOF

CROSS-REFERENCE TO RELATED APPLICATION

This application claims priority from Korean Patent Application No. 10-2010-0116088, filed on Nov. 22, 2010 in the Korean Intellectual Property Office, the disclosure of which is incorporated herein by reference.

BACKGROUND

1. Field

Apparatuses and methods consistent with the exemplary embodiments relate to a signal processing apparatus such as a television (TV), a set-top box, etc., and more particularly, to a signal processing apparatus capable of outputting an audio signal or the like to an external device through a connector, and a control method thereof.

2. Description of the Related Art

A signal processing apparatus such as a television (TV), a set-top box, etc. may output an audio signal or the like to an external device (hereinafter, referred to as an "audio output device" by regarding the audio signal as a representative example) such as an amplifier, a home theater, etc. through a connector. In this case, the signal processing apparatus may have various types of connector. For instance, the connector may be designed as an optical output type by taking desired audio quality into account. Such a connector may be placed at a lateral side or the like of the signal processing apparatus.

Meanwhile, with a recent trend of making the signal processing apparatus thin and small, it has been required to minimize the width of the lateral side or the like of the signal processing apparatus. However, since the optical output type connector has a fixed size based on relevant standards, there arises a problem that the size of the connector imposes restrictions on making the signal processing apparatus thin and small.

Even if such a connector is replaced by another smaller type one, a user may confuse such a connector and attempt to connect an unfitted device such as a headset thereto, which may damage the unfitted device.

SUMMARY

According to an aspect of one or more exemplary embodiments, there is provided a signal processing apparatus, a width or the like outward size of which can be minimized to be suited for slimness and miniaturization, and a control method thereof.

According to another aspect, there is provided a signal processing apparatus and a control method thereof, in which an outward size of a connector is minimized and a connected device is protected even when misconnected due to a user's confusion.

The foregoing and/or other aspects may be achieved by providing a signal processing apparatus including: a signal processor which processes a data signal; a power supply which generates a power signal for supplying power; a connector to which an external connector is connected; and a control circuit which outputs the data signal processed by the signal processor and the power signal generated by the power supply if the external connector is connected to the connector, and performs a shutoff operation not to output the power signal to the external connector if the connector has an abnormal voltage level.

The connector may include a plurality of pins, and the control circuit may perform the shutoff operation if a power pin, through which the power signal is output, among the plurality of pins has an abnormal voltage level.

The control circuit may include a switching unit which includes an enabling pin and operates to selectively output the power signal through the connector in accordance with voltage levels of the enabling pin; and a resistor which connects the power pin with the enabling pin of the switching unit.

The plurality of pins may further include a connection detecting pin for detecting whether the external connector is connected to the connector, and the enabling pin of the switching unit may be connected to the connection detecting pin.

The connector may include a tip-ring-sleeve (TRS) connector.

Another aspect may be achieved by providing a method of controlling a signal processing apparatus including a connector to which an external connector is connectable, the method including: processing a data signal; generating a power signal for supplying power; and outputting the data signal processed by the signal processor and the power signal generated by the power supply if the external connector is connected to the connector, and performing a shutoff operation not to output the power signal to the external connector if the connector has an abnormal voltage level.

The connector may include a plurality of pins, and the performing the shutoff operation may include performing the shutoff operation if a power pin, through which the power signal is output, among the plurality of pins has an abnormal voltage level.

The plurality of pins may further include a connection detecting pin for detecting whether the external connector is connected to the connector, and the performing the shutoff operation may include performing the shutoff operation if a detection result of the connection detecting pin shows that the external connector is not connected to the connector.

The connector may include a tip-ring-sleeve (TRS) connector.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
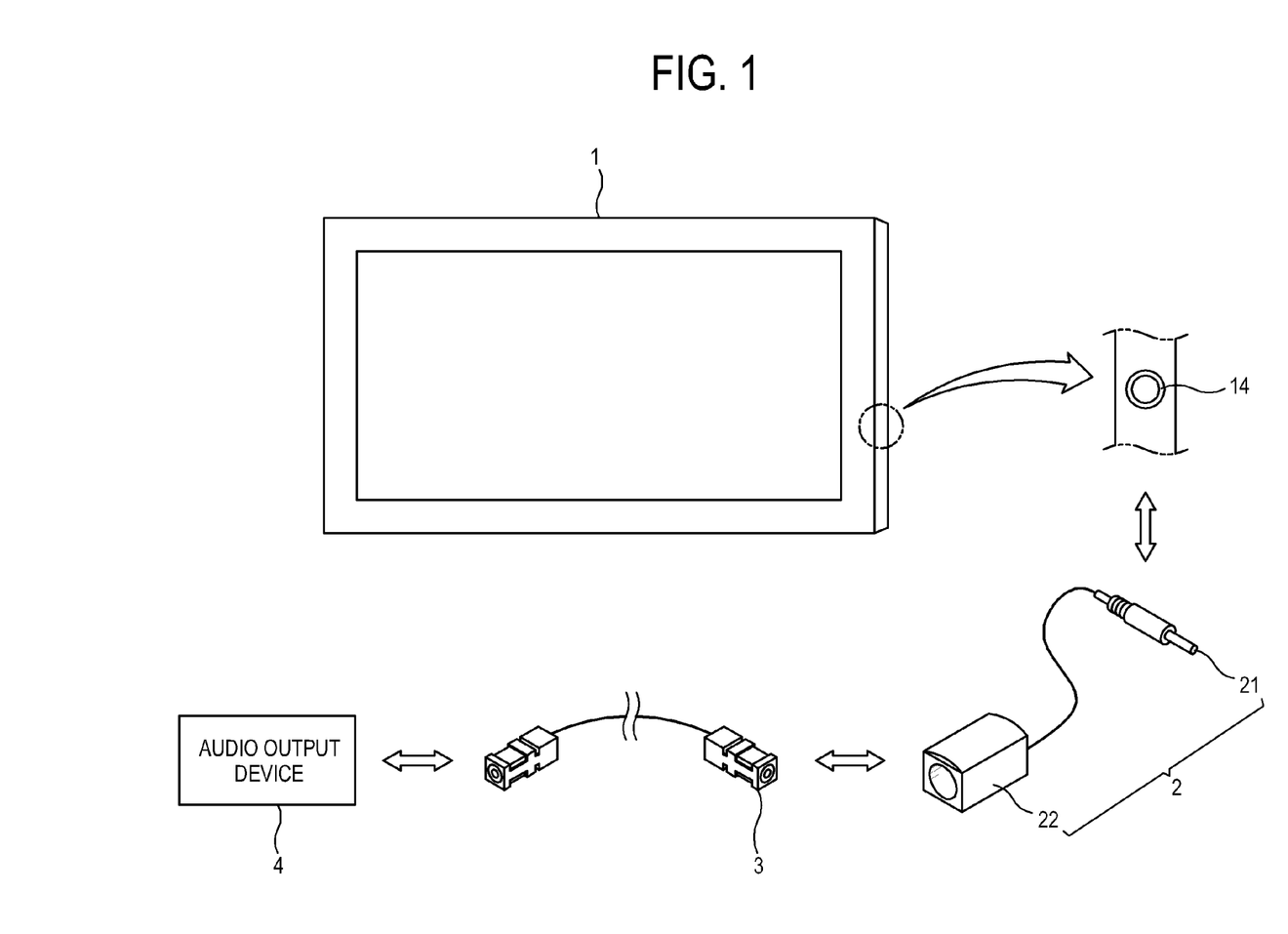
FIG. 1 illustrates a signal processing apparatus according to an exemplary embodiment.

Below, an exemplary embodiment will be described in detail with reference to accompanying drawings. FIG. 1 illustrates a signal processing apparatus 1 according to an exemplary embodiment. The signal processing apparatus 1 may be a television (TV), a set-top box, etc. The signal processing apparatus 1 processes a data signal, which may include an audio signal, video signal, or the like, and outputs it to an external device through a connector 14. A gender 2 may be connected to the connector 14, and an audio signal output through the connector 14 may be transmitted to an audio output device 4 such as an amplifier, a home theater, etc. via an optical cable 3. In this exemplary embodiment, the data signal output through the connector 14 is an audio signal, but not limited thereto. Alternatively, the signal output through the connector 14 may include a video signal. In the case of the video signal, a device to which the video signal is transmitted may be a video output device (not shown) instead of the audio output device 4.

As shown in FIG. 1, the signal processing apparatus 1 may output a power signal through the connector 14. The gender 2 shown in FIG. 1 includes a first connector 21 connected to the connector 14 of the signal processing apparatus 1, and a second connector 22 connected to one end of the optical cable 3. The second connector 22 may be provided with an optical signal generator (not shown) that generates an optical signal based on a power signal and an audio signal output from the connector 14. The connector 14 of the signal processing apparatus 1 may be achieved by a small type connector in consideration of slimness and miniaturization. The type of connector 14 may be a (female) connector based on tip-ring-sleeve (TRS) standards and having a diameter of 3.5 mm. Correspondingly, the first connector 21 may be a (male) connector based on the TRS standards. Meanwhile, the second connector 22 of the gender 2 may be an optical connectors based on known standards. Thus, the signal processing apparatus 1 can transmit an audio signal in the form of an optical signal to the audio output device 4 through the gender 2, so that the quality of the audio signal can be guaranteed. Further, the slimness and miniaturization of the signal processing apparatus 1 can be achieved as being provided with the relatively small-sized connector 14 instead of a large-sized connector for directly outputting the optical signal. In this exemplary embodiment, an audio signal output through the connector 14 is converted into an optical signal through the gender 2, but is not limited thereto. Alternatively, an external connector connected to the connector 14 may include various connectors.

Figure 2:
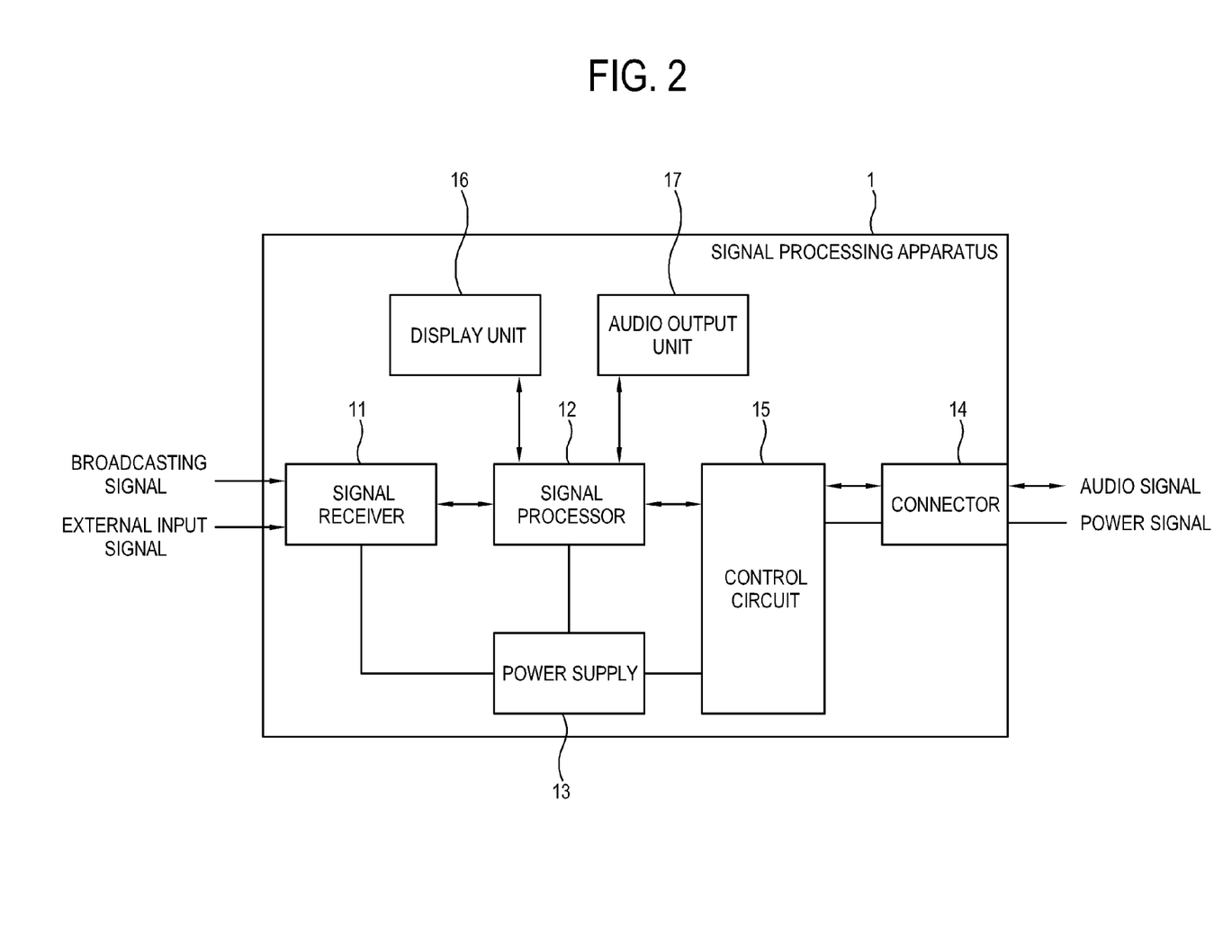
FIG. 2 is a block diagram showing a configuration of the signal processing apparatus shown in FIG. 1.

FIG. 2 is a block diagram showing a configuration of the signal processing apparatus 1 shown in FIG. 1. The signal processing apparatus 1 includes a signal receiver 11, a signal processor 12, a power supply 13, a connector 14, a control circuit 15, a display unit 16, and an audio output unit 17. The signal receiver 11 receives a signal from an external source. The signal received by the signal receiver 11 may include a broadcasting signal and an external input signal. In the case of the broadcasting signal, the signal receiver 11 may receive a broadcasting signal from a broadcasting station while performing tuning to one of channels of the broadcasting signal. In the case of the external input signal, the external input signal may include a video signal and/or audio signal, and may be received from a digital versatile disc (DVD) player, a Bluray disc player, or the like video device.

The signal processor 12 performs signal processing for acquiring video and/or audio from the broadcasting signal and/or the external input signal received by the signal receiver 11. The process performed by the signal processor 12 may include decoding, scaling, image-enhancing, audio signal processing, etc. The video signal acquired by the signal processor 12 is transmitted to the display unit 16, and the audio signal is transmitted to the audio output unit 17.

The display unit 16 displays an image based on the video signal processed by the signal processor 12. There are various display methods for the display unit 16, and the display unit 16 may include a liquid crystal display (LCD), an organic light emitting diode (OLED) display, a plasma display panel (PDP), a projection display, etc. The audio output unit 17 outputs audio based on the audio signal processed by the signal processor 12, and may include an amplifying circuit and a loudspeaker.

The power supply 13 supplies power for operating the signal processing apparatus 1. The power supply 13 receives alternating current (AC) power from an external source and transforms it into a power signal having a voltage level of 5V, for example.

The connector 14 is connected to an external connector, i.e., the gender 2 as described above, and outputs an audio signal processed by the signal processor 12 and a power signal generated by the power supply 13 to the gender 2.

The control circuit 15 controls the power signal generated by the power supply 13 to be selectively output through the connector 14 in accordance with a connection state between the connector 14 and the external connector.

FIG. 2 illustrates that the signal processing apparatus 1 is a display apparatus such as a TV, but the signal processing apparatus 1 is not limited thereto. The signal processing apparatus 1 may be achieved by a set-top box or the like. If the signal processing apparatus is a set-top box, the display unit 16 may be omitted from the configuration of the signal processing apparatus 1 shown in FIG. 2.

Figure 3:
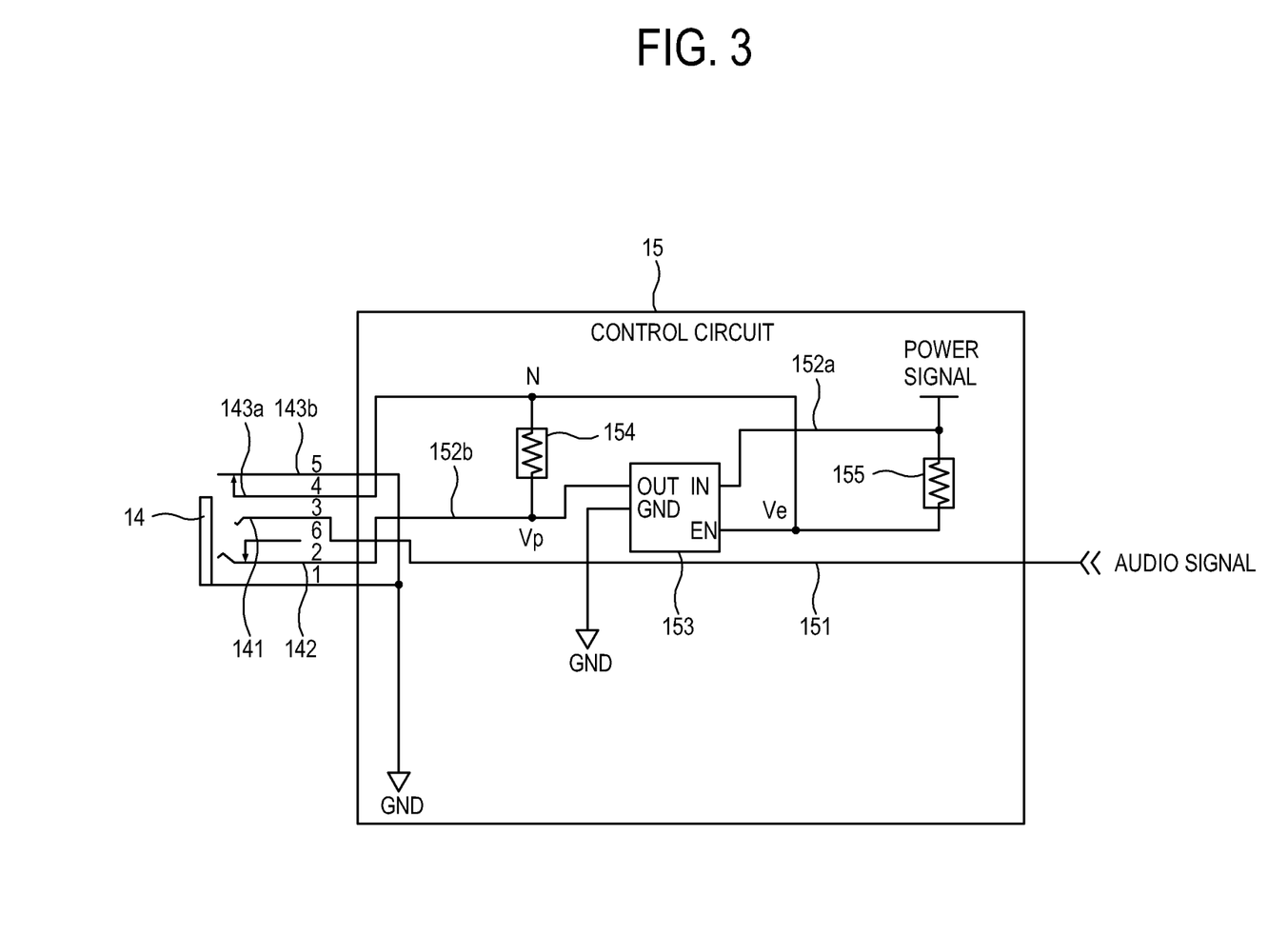
FIG. 3 is a circuit diagram showing a configuration of a connector and a control circuit in the signal processing apparatus shown in FIG. 2.

FIG. 3 is a circuit diagram showing a configuration of the connector 14 and the control circuit 15 in the signal processing apparatus shown in FIG. 2. As shown in FIG. 3, the connector 14 is a TRS type (female) connector having six pins. The six pins of the connector 14 include a signal pin 141 through which an audio signal is output, a power pin 142 through which a power signal is output, and connection detecting pins 143*a* and 143*b* for detecting whether the external connector is connected.

The control circuit 15 includes a first signal transmission line 151 for transmitting an audio signal processed by the signal processor to the signal pin 141, and second signal transmission lines 152*a* and 152*b* for transmitting a power signal generated by the power supply 13 to the power pin 142 of the connector 14.

The control circuit 15 may further include a switching unit 153 so that the power signal generated by the power supply 13 can be selectively transmitted through the connector 14. The switching unit 153 may include a power input pin IN for receiving a power signal, a power output pin OUT for outputting the received power signal, and a ground pin GND for grounding. Also, the switching unit 153 may further include an enabling pin EN and may perform switching so that the power signal can be selectively output through the power output pin OUT in accordance with a voltage level Ve of the enabling pin EN.

The control circuit 15 may further include a first resistor 154 having a first end Vp connected to the power output pin OUT of the switching unit 153, i.e., the power pin 142 of the connector 14, and a second end N connected to the enabling pin EN of the switching unit 153. The control circuit 15 may also include a second resistor 155 connected between the enabling pin EN of the switching unit 153 and a power signal input terminal for the control circuit 15. The enabling pin EN of the switching unit 153 and the second end N of the first resistor 154 may be connected to one connection detecting pin 143*a* of the connector 14. Meanwhile, the other connection detecting pin 143*b* of the connector 14 is grounded.

Figure 4:
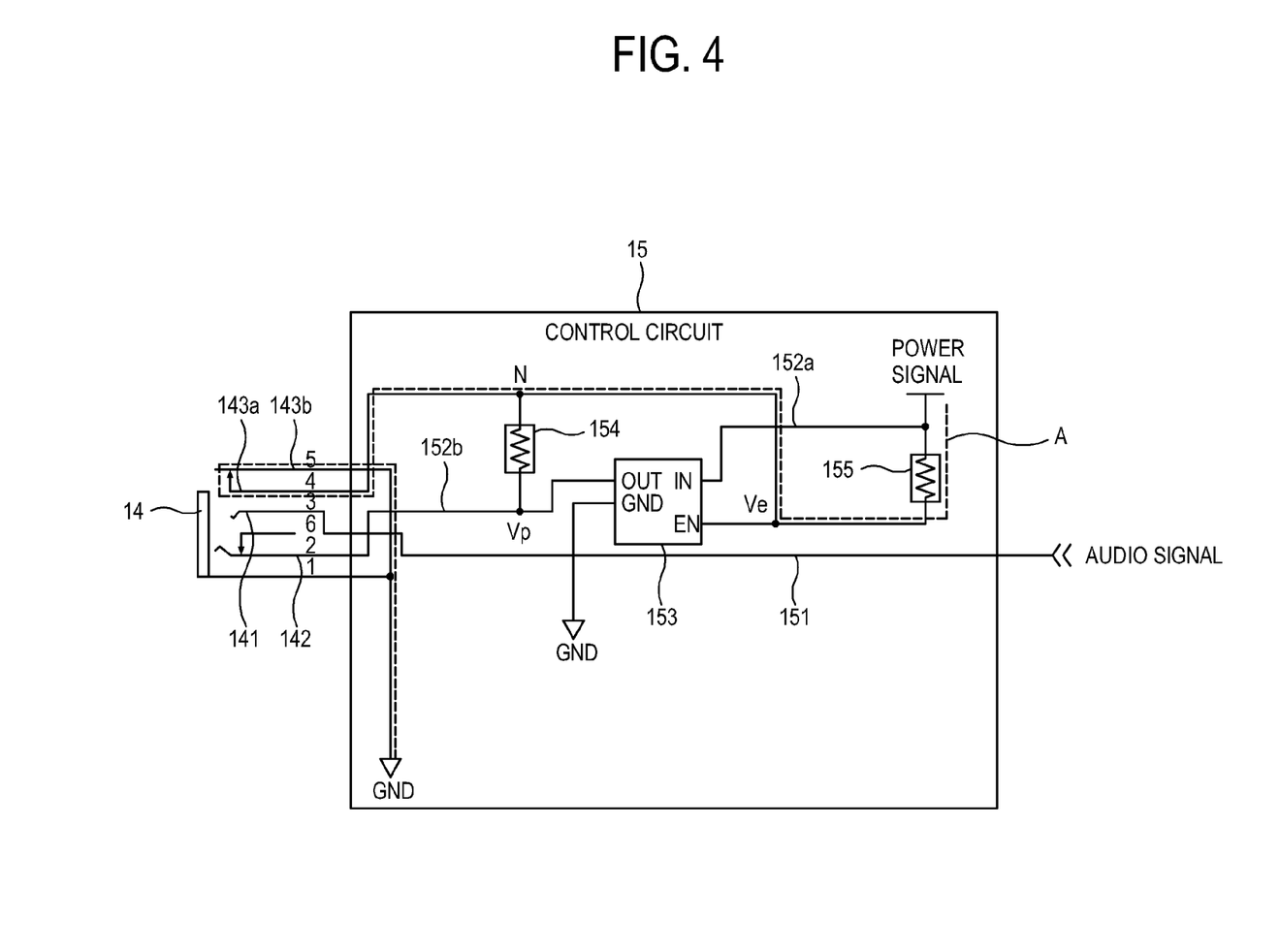
FIGS. 4 to 6 illustrate examples of a detailed operation of the control circuit shown in FIG. 3.

FIG. 4 illustrates an example of a detailed operation of the control circuit 15 shown in FIG. 3. In the control circuit 15 shown in FIG. 4, no external connector is connected to the connector 14. In this case, the connection detecting pins 143*a* and 143b of the connector 14 become a closed state, i.e., form a closed circuit like a path "A" shown in FIG. 4. At this time, the voltage level Ve of the enabling pin EN becomes a low state (i.e., abnormal), which is lower than an operation threshold voltage of the switching unit 153, and thus the switching unit 153 is turned off, thereby outputting no power signal (hereinafter, referred to as a "shutoff" operation).

Figure 5:
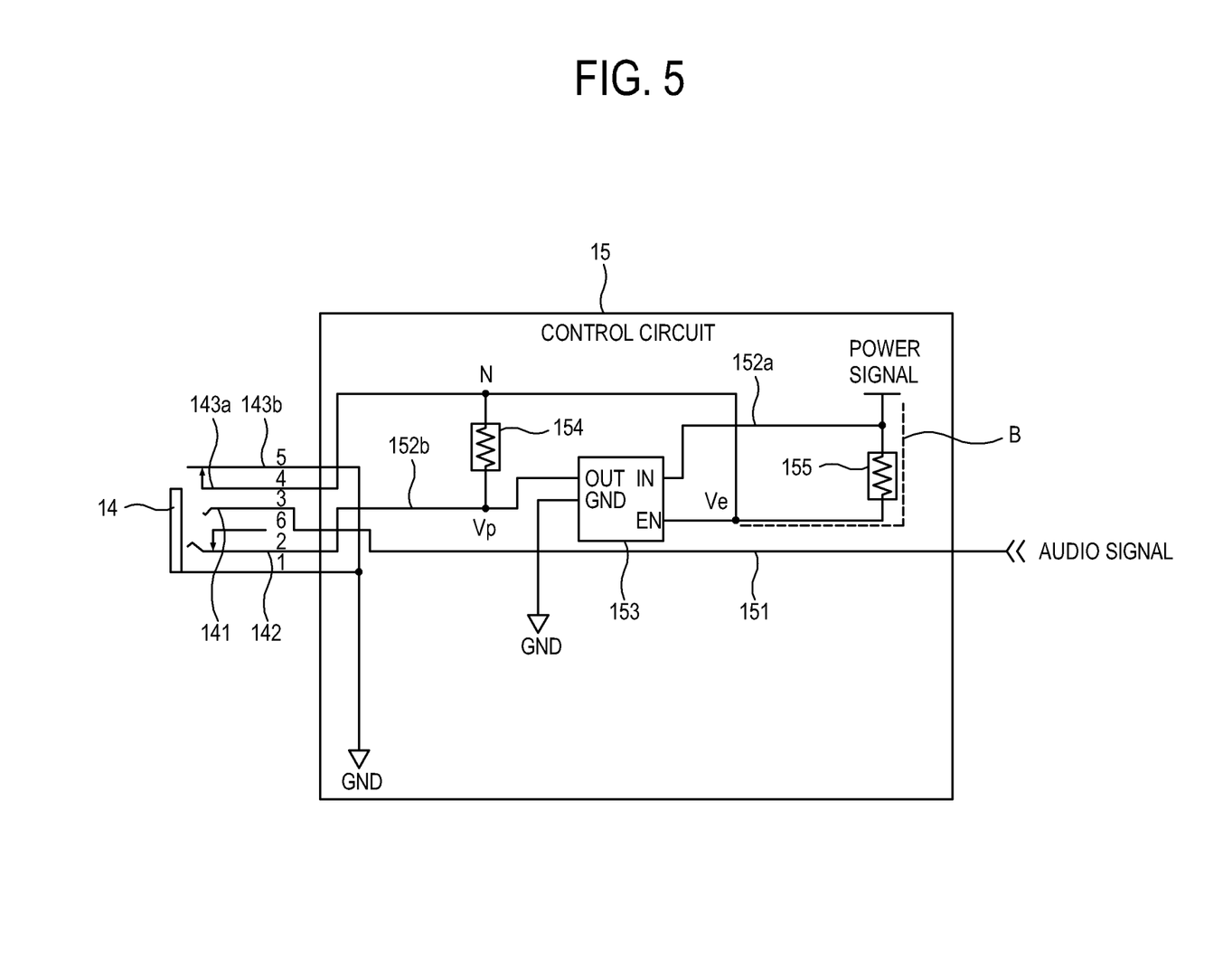

FIG. 5 illustrates another example of a detailed operation of the control circuit 15 shown in FIG. 3. In the control circuit 15 shown in FIG. 5, an external connector is connected in a normal manner to the connector 14. For example, assume that the first connector 21 of the gender 2 as shown in FIG. 1 is connected to the connector 14. In this case, the connection detecting pins 143a and 143b of the connector 14 become an opened state, and the voltage level Ve of the enabling pin EN becomes a high state (i.e., normal), which is higher than the operation threshold voltage of the switching unit 153 (see a path "B" shown in FIG. 5. At this time, the second resistor 154 connected to the power output pin OUT has no effect on an enabling operation). Thus, the switching unit 153 is turned on, thereby normally outputting a power signal to the power pin 142.

Figure 6:
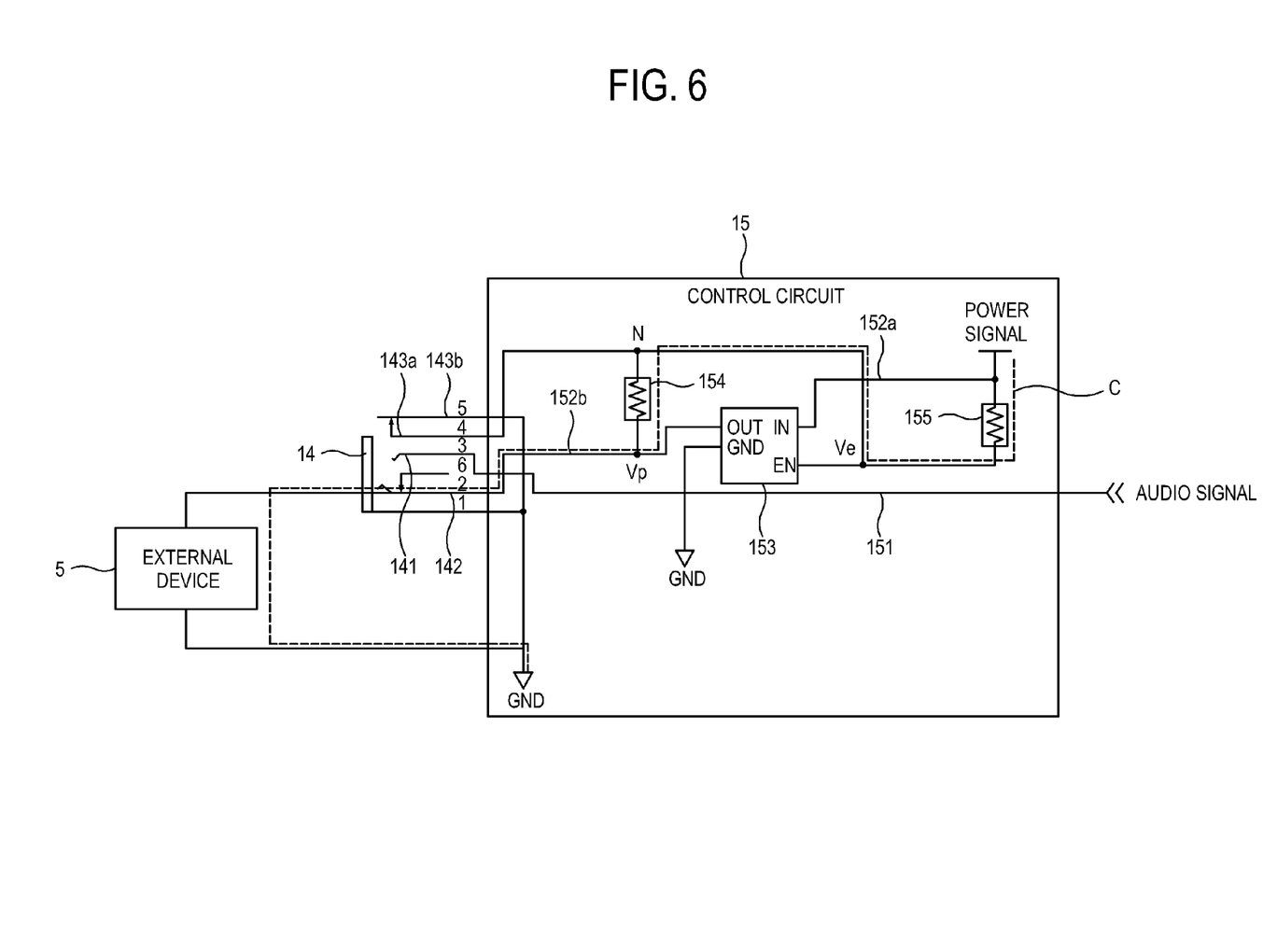

FIG. 6 illustrates still another example of a detailed operation of the control circuit 15 shown in FIG. 3. In the control circuit 15 shown in FIG. 6, an external connector is abnormally connected to the connector 14. For example, assume that the gender 2 as shown in FIG. 1 is not connected, but a (male) connector of a typical external device 5 such as a headphone, an ear phone, etc. having the same standard (e.g., 3.5 mm TRS) as the connector 14 is connected to the connector 14. To operate such a typical external device 5 as a headphone, an ear phone, etc., there is no need for supplying the power signal. Rather, low impedance of such an external device 5 as headphone, an ear phone, etc. may cause the external device to be damaged by the power signal. Also, the first resistor 154 and the second resistor 155 are designed to have impedance high enough to neglect the impedance of the external device 5.

If the (male) connector of the external device 5 is connected to the connector 14, a closed circuit is formed like a path "C" shown in FIG. 6. However, the voltage level Ve of the enabling pin EN is relatively lowered when the external device 5 is connected, as compared with when the audio output device 4 is normally connected through the gender 2 (refer to FIG. 5). That is, the voltage level Ve of the enabling pin EN becomes a low state (abnormal), which is lower than the operation threshold voltage of the switching unit 153, and therefore the switching unit 153 is turned off, thereby outputting no power signal. Accordingly, even if a user mistakenly connects a connector of an external device 5 such as a headphone, an ear phone, etc., instead of the gender 2, to the connector 14, the shutoff operation is performed to not output the power signal, thereby preventing the external device 5 from being damaged.

Figure 7:
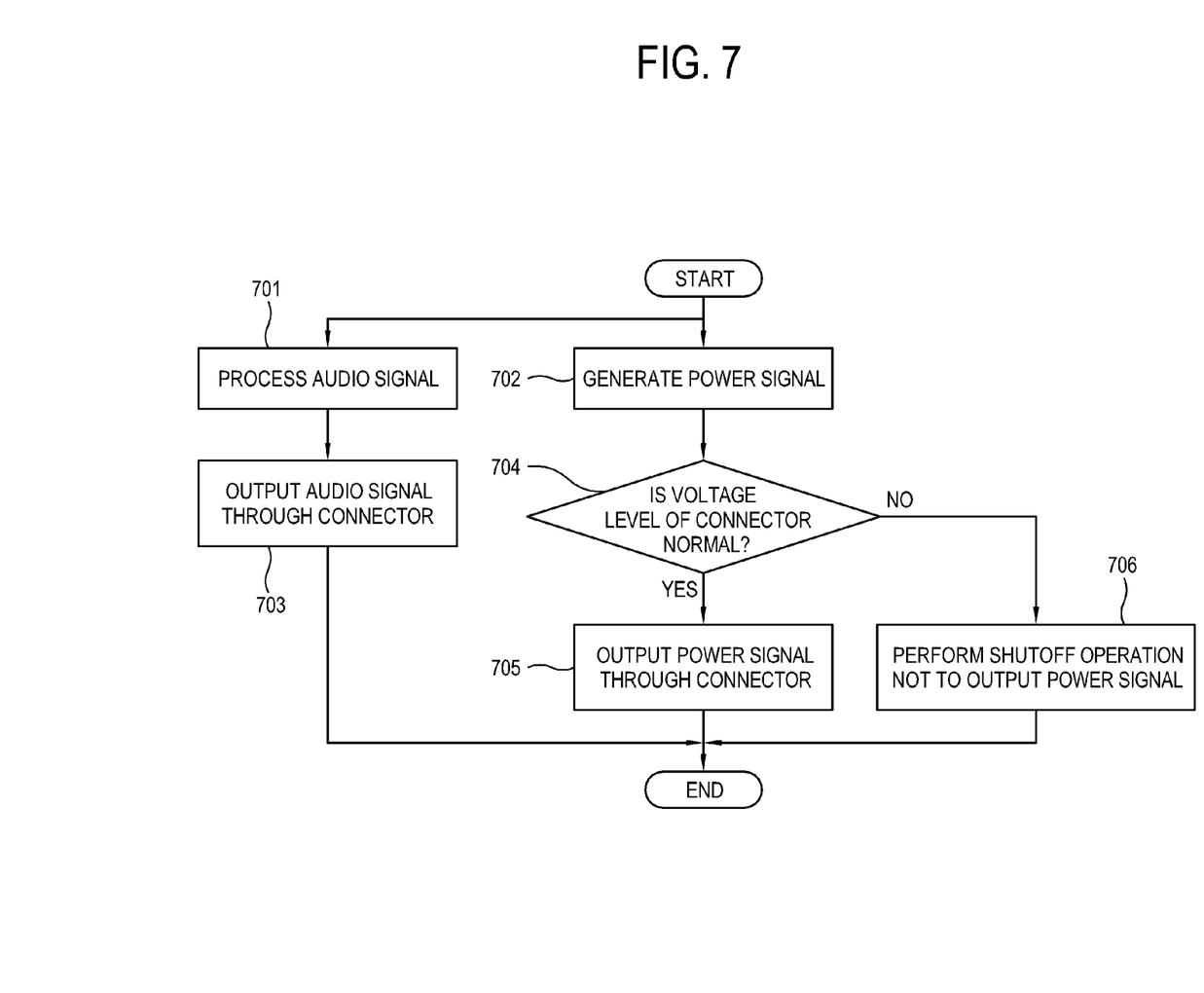
FIG. 7 is a flowchart showing an operation of the signal processing apparatus shown in FIGS. 1 to 6.

FIG. 7 is a flowchart showing an operation of the signal processing apparatus 1 shown in FIGS. 1 to 6. First, at operation 701, an audio signal is processed. In parallel with the operation 701, a power signal is generated at operation 702. Then, at operation 703, the processed audio signal is output through the connector 14 when the gender 2 is connected to the connector 14. Also, at operation 704, it is ascertained whether the voltage level of the connector 14 is normal (e.g., when the gender 2 is connected to the connector 14). If the voltage level of the connector 14 is normal in the operation 704, a power signal is output through the connector 14 at operation 705. On the other hand, if the voltage level of the connector 14 is abnormal in the operation 704, the shutoff operation is performed to not output a power signal through the connector 14 at operation 706.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A signal processing apparatus comprising:
   a signal processor which processes a data signal;
   a power supply which generates a power signal;
   a first connector configured to be connected with an external second connector; and
   a control circuit which outputs the data signal and the power signal if the external second connector is connected to the first connector, and performs a shutoff operation to not output the power signal if the first connector is not connected to the external second connector;
   wherein the first connector comprises a plurality of pins, including a power pin, and the control circuit performs the shutoff operation by not outputting the power signal to the power pin of the first connector; and
   wherein the control circuit comprises:
      a switching unit which comprises an enabling pin; and
      a resistor which connects the power pin of the first connector with the enabling pin of the switching unit;
      wherein the switching unit receives the power signal at the enabling pin and selectively outputs the power signal to the first connector based on a voltage level of the enabling pin, and
      wherein the switching unit outputs the power signal to the first connector when the external second connector of a first external device having a first impedance is connected to the first connector, and does not output the power signal to the first connector when the external second connector of a second external device having a second impedance that is lower than the first impedance is connected to the first connector.

2. The signal processing apparatus according to claim 1, wherein
   the plurality of pins further comprises a connection detecting pin that detects whether the external second connector is connected to the first connector, and
   the enabling pin of the switching unit is connected to the connection detecting pin.

3. The signal processing apparatus according to claim 1, wherein the first connector comprises a tip-ring-sleeve (TRS) connector.

4. The signal processing apparatus according to claim 1, wherein if the external second connector is not connected to the first connector, the voltage level of the enabling pin is lower than an operation threshold voltage of the switching unit, and the control circuit performs the shutoff operation.

5. The signal processing apparatus according to claim 1, wherein if the external second connector is connected to the connector, the voltage level of the enabling pin is higher than an operation threshold voltage of the switching unit, and the control circuit outputs the power signal to the power pin of the first connector.

6. The signal processing apparatus according to claim 1, wherein if the voltage level of the enabling pin is lower than an operation threshold voltage of the switching unit, the control circuit performs the shutoff operation.

7. A method of controlling a signal processing apparatus comprising a first connector, the method comprising:
   processing a data signal;

generating a power signal;

outputting the data signal and the power signal if an external second connector is connected to the first connector; and performing a shutoff operation to not output the power signal if the first connector is not connected to the external second connector;

wherein the outputting comprises outputting the power signal to a power pin of the first connector if the external second connector is connected to the first connector;

wherein the performing the shutoff operation comprises not outputting the power signal to the power pin if the first connector is not connected to the external second connector; and wherein the signal processing apparatus comprises a switching unit and a resistor which connects the power pin of the first connector with an enabling pin of the switching unit, wherein the switching unit receives the power signal at the enabling pin, and wherein the switching unit outputs the power signal to the first connector when the external second connector of a first external device having a first impedance is connected to the first connector, and does not output the power signal to the first connector when the external second connector of a second external device having a second impedance that is lower than the first impedance is connected to the first connector.

8. The method according to claim 7, -further comprising:
receiving, by the switching unit, the power signal; and
selectively outputting the power signal based on a voltage level of an enabling pin of the switching unit.

9. The method according to claim 7, wherein the first connector comprises a tip-ring-sleeve (TRS) connector.

10. The method according to claim 7, wherein the performing the shutoff operation comprises not outputting the power signal to the power pin if a connection detecting pin of the first connector detects that the first connector is not connected to the external second connector.

11. The method according to claim 8, wherein the performing of the shutoff operation comprises not outputting the power signal if the voltage level of the enabling pin is lower than an operation threshold voltage of the switching unit.

12. The method according to claim 8, wherein the selectively outputting the power signal comprises outputting the power signal to the power pin if the voltage level of the enabling pin is higher than an operation threshold voltage of the switching unit.

13. A control circuit that controls the output of a data signal and a power signal, the control circuit comprising:
an input that receives the data signal;
an output that outputs the data signal;
a switching unit comprising an input pin, an output pin, and an enabling pin at which the power signal is received;
a resistor connected between the output pin and the enabling pin; and
a first connector;
wherein the input pin receives the power signal, and the output pin outputs the power signal based on a voltage level of the enabling pin, and
wherein the switching unit outputs the power signal to the first connector when an external second connector of a first external device having a first impedance is connected to the first connector, and does not output the power signal to the first connector when an external second connector of a second external device having a second impedance that is lower than the first impedance is connected to the first connector.

14. The control circuit of claim 13, wherein the output pin outputs the power signal if the voltage level of the enabling pin is higher than an operation threshold voltage of the switching unit.

15. The control circuit of claim 13, wherein the output pin does not output the power signal if the voltage level of the enabling pin is lower than an operation threshold voltage of the switching unit.

* * * * *